(12) United States Patent
Sidhu et al.

(10) Patent No.: US 8,117,814 B2
(45) Date of Patent: Feb. 21, 2012

(54) CROP CATCHING APPARATUS AND CROP HARVESTING MACHINE EMPLOYING THE SAME

(76) Inventors: Rupinder Singh Sidhu, Abbotsford (CA); Parminder Cheema, Abbotsford (CA)

( * ) Notice: Subject to any disclaimer, the term of this patent is extended or adjusted under 35 U.S.C. 154(b) by 0 days.

(21) Appl. No.: 12/685,586

(22) Filed: Jan. 11, 2010

(65) Prior Publication Data
US 2011/0167778 A1   Jul. 14, 2011

(51) Int. Cl.
*A01D 46/22* (2006.01)
(52) U.S. Cl. ......................................................... 56/329
(58) Field of Classification Search ............... 56/328.1, 56/329, 330, 327.1, 340.1; 280/6.15, 6.154, 280/124.16, 124.112, 483, 124.106, 5.508
See application file for complete search history.

(56) References Cited

U.S. PATENT DOCUMENTS

| 3,690,054 | A | * | 9/1972 | De Carlo et al. | 56/330 |
| 4,134,251 | A | * | 1/1979 | Burton | 56/330 |
| 4,303,373 | A | | 12/1981 | Polhemus | |
| 5,074,107 | A | | 12/1991 | Windemuller | |
| 5,113,644 | A | | 5/1992 | Windemuller et al. | |
| 5,181,373 | A | | 1/1993 | Littau | |
| 5,259,177 | A | | 11/1993 | Windemuller et al. | |
| 5,341,630 | A | * | 8/1994 | Littau | 56/330 |
| 5,499,493 | A | | 3/1996 | Rosset | |
| 5,647,194 | A | * | 7/1997 | Scott et al. | 56/328.1 |
| 7,407,166 | B2 | * | 8/2008 | Briesemeister et al. | 280/6.154 |
| 2008/0307764 | A1 | | 12/2008 | Johnson et al. | |

* cited by examiner

*Primary Examiner* — Robert Pezzuto
(74) *Attorney, Agent, or Firm* — Laurence C. Bonar

(57) ABSTRACT

A crop-catching apparatus for use in a crop harvesting machine includes one or more plate members and one or more fluid conduits. The plate member(s) each have a surface adapted for catching falling crops, a front end and a back end, and a leading edge. The back end(s) are configured to pivotally mount on the crop harvesting machine. The front end(s) are configured to rest at a higher elevation with respect to the pivotally mounted back end(s). The conduit(s) are defined within at least one of the plate member(s) for carrying one or more fluids, and include one or more fluid inlets defined on the at least one of the plate member(s) for receiving the one or more fluids; and one or more fluid outlets defined on the at least one of the plate member(s) running at least partially along the leading edge(s) of the at least one of the plate member(s). The fluid outlet(s) are configured such that the one or more fluids exit therefrom to divert a direction of fall of the crops. A crop harvesting machine also employs a crop-catching apparatus.

20 Claims, 8 Drawing Sheets

CROP CATCHING APPARATUS AND CROP HARVESTING MACHINE EMPLOYING THE SAME

1. TECHNICAL FIELD

The present invention relates generally to crop catching apparatuses for use in crop harvesting machines. More particularly, the present invention relates to improved crop catching apparatuses with fluid conduits defined in catcher plate members, and to crop harvesting machines employing the same.

2. BACKGROUND OF THE INVENTION

A conventional crop harvesting machine suited for harvesting berries or other bush-grown or small tree-grown crops such as coffee beans, etc., typically includes a mobile frame that is supported by wheels and set into motion via manual or motorized propulsion. To harvest crops, the frame of the crop harvesting machine is maneuvered over a crop plant such as a bush or small tree, and straddles the crop plant in the interior cavity of the machine. The cavity of the frame in the machine is typically in an inverted U-shape formed by a lateral interior roof surface joined at two ends by two opposing interior vertical side surfaces. To cause crops to be severed from the straddled crop plant, the crop harvesting machine typically includes a plurality of flexible arms or other means to impart shaking or other motions on the crops to cause them to fall from the crop plant. The flexible arms are typically disposed on the two opposing interior vertical side surfaces of the frame and extend inwards to contact crop plant s straddled within the cavity. To collect falling crops, the crop harvesting machine additionally typically includes a collecting surface disposed within the interior cavity of the frame below the flexible arms. A conveyer belt transfers the fallen crops from the collecting surface to the rear of the crop harvesting machine such as to be placed into collecting containers.

A drawback of existing crop harvesting machines is their inefficiency in preventing dropped crops which are not effectively collected by the machine. To accommodate the stem or trunk of the crop plants straddled in the interior cavity of the machine, the collecting surface of the crop harvesting machine typically has a central opening. During harvesting, up to as much as twenty-five percent of severed crops may be lost by their falling directly downward through that central opening onto the ground.

Accordingly, there is an outstanding need in the crop harvesting machine art to provide means for reducing crop loss and improving harvesting efficiency.

3. SUMMARY OF THE INVENTION

Certain features, aspects and examples disclosed herein are directed to crop-catching apparatuses configured to divert a direction of fall of crops such as may be adapted for use in a crop harvesting machine. More particularly, certain features, aspects and examples are directed to a crop-catching apparatus for use in a crop harvesting machine and to a crop harvesting machine employing said crop-catching apparatus which may desirably be more efficient than a conventional crop harvesting machine in crop collection and prevention of crop loss during harvesting. Additional features, aspects and examples are discussed in more detail herein.

In accordance with a first aspect, a crop-catching apparatus for use in a crop harvesting machine is disclosed. The crop-catching apparatus includes one or more plate members and one or more fluid conduits defined within at least one of the one or more plate members for carrying one or more fluids. The plate member(s) each has a surface adapted for catching falling crops. Each of the plate member(s) further has 1) a back end configured to pivotally mount on the crop harvesting machine, and 2) a front end configured to rest at a higher elevation with respect to the pivotally mounted back end. The plate member(s) each further has a leading edge. The one or more conduits are defined within at least one of the plate member(s) for carrying one or more fluids, and include 1) one or more fluid inlets defined on the at least one of the plate member(s) for receiving the one or more fluids, and 2) one or more fluid outlets defined on the at least one of the plate member(s) running at least partially along the leading edge(s) of the plate member(s) and which are fluidly connected to the fluid inlet(s) by the fluid conduit. The one or more fluid outlets are configured such that one or more fluids may exit therefrom such as under pressure, to divert a direction of fall of the crops falling onto or adjacent to the fluid outlets of the plate members.

In accordance with another aspect, a crop-catching apparatus is disclosed. The crop-catching apparatus includes one or more plate members for catching falling crops and adapted to be fitted to a crop harvesting machine, and one or more fluid conduits defined within at least one of the one or more first plate members for carrying one or more fluids input from a fluid source to one or more fluid outputs, for outputting the one or more fluids to divert a direction of fall of crops.

In accordance with an additional aspect, a crop harvesting machine is disclosed. The crop harvesting machine includes a mobile frame, means for severing crops grown on a crop plant, and a crop-catching apparatus pivotally connected to the mobile frame. The crop-catching apparatus includes one or more plate members adapted for catching falling crops, and one or more fluid conduits defined within at least one of the plate member for carrying one or more fluids input from a fluid source to one or more fluid outputs, for outputting the one or more fluids to divert a direction of fall of crops falling onto or adjacent to the fluid outputs of the plate members.

Embodiments of the present invention may include one or more of the following features. In some embodiments, the one or more plate members may include one or more top plate members and one or more bottom plate members. The top plate members and bottom plate members may have their respective back ends pivotally mounted on the crop harvesting machine in a manner such that the top plate members and the bottom plate members may form respective rows of corresponding plate members along the length of the crop harvesting machine and oppose each other. The plate members on each row may partially overlap neighboring plate members in the same row. In some embodiments, the opposing top plate members and the bottom plate members may partially overlap each other with the top plate members disposed on top of the bottom plate members. In some embodiments, the opposing top plate members and the bottom plate members may not overlap each other.

In some embodiments, the one or more fluid conduits may be defined within the top plate members of each of the top and bottom plate pairs. In some embodiments, the one or more fluid conduits may be defined within the top plate members and the bottom plate members.

In some further embodiments, the crop harvesting machine may include a crop harvesting tunnel for straddling crop plants therein. The crop harvesting tunnel may comprise opposing vertical sides. The top plate members and the bottom plate members may have their respective back ends pivotally mounted on or adjacent to the opposing vertical sides of the crop harvesting tunnel of the crop harvesting machine.

In some embodiments, at least a portion of the leading edge(s) of each of the plate members(s) may be configured to contact stems of the crop plants and hinge away from the center of the crop harvesting tunnel to allow the stems of the crop plants to pass between the opposing top plate members and corresponding bottom plate members.

In some embodiments, the one or more fluid outlets may be oriented such that the fluids exiting therefrom move forward and outward beyond the leading edge(s) of the at least one of the one or more plate members.

In some embodiments, the surface(s) of the one or more plate members may be substantially planar. The front end(s) of the one or more plate members may be angled with respect to the substantially planar surface(s).

Further advantages of the invention will become apparent when considering the drawings in conjunction with the detailed description.

4. BRIEF DESCRIPTION OF THE DRAWINGS

Embodiments of the present invention will now be described with reference to the accompanying drawing figures, in which.

Similar reference numerals refer to corresponding parts throughout the several views of the drawings.

5. DETAILED DESCRIPTION OF THE INVENTION

In one embodiment, the present invention comprises a crop catching apparatus that provides for utilizing output of a fluid flow to reduce loss of crops and thereby improve the efficiency of crop collection during harvesting. In one embodiment, the crop-catching apparatus may be retrofitted to existing crop harvesting machines, or included as part of a novel crop harvesting machine as disclosed herein. More specifically, in one embodiment, the crop catching apparatus includes one or more fluid conduits defined within or between one or more plate members to receive, carry, and output one or more fluids such as to divert a direction of fall of the crops as they fall onto or adjacent to the fluid outputs of the plate members. The diversion of crop fall feature as disclosed herein in the present crop catching apparatus/crop harvesting machine provides a significant improvement over conventional crop harvesting machines, where severed crops that would have otherwise been lost by directly falling downward through a plate opening are advantageously diverted and collected.

Figure 1:
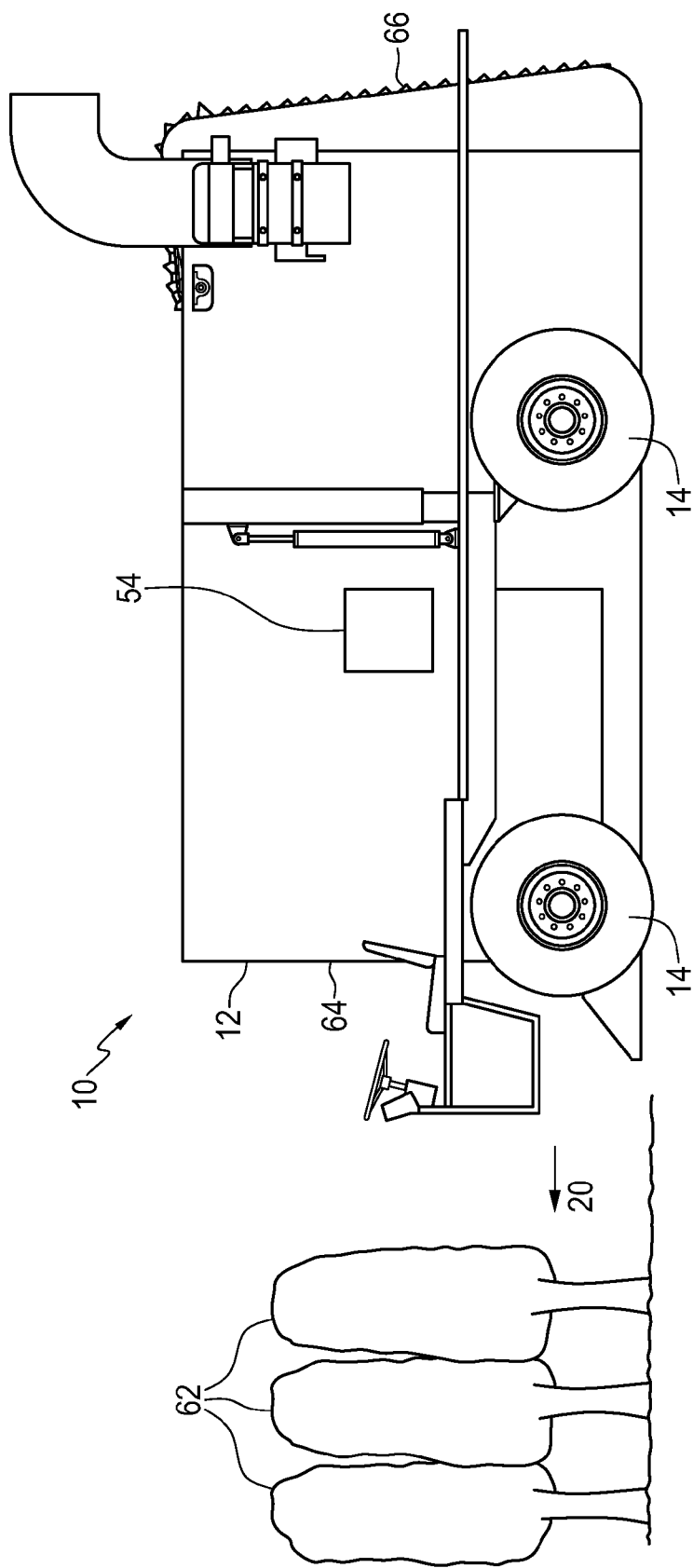
FIG. 1 illustrates a simplified side view of an exemplary crop harvesting machine according to an embodiment of the present invention.
Figure 2A:
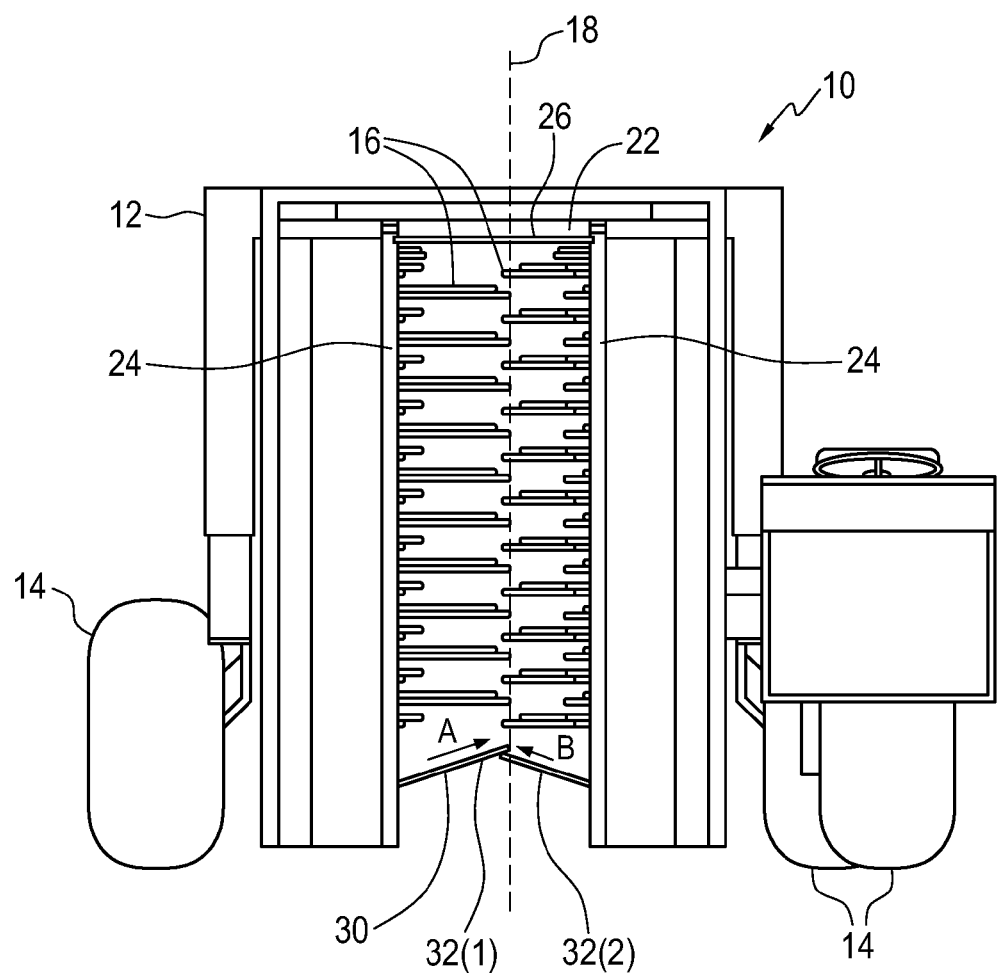
FIG. 2A illustrates a front end view of the exemplary crop harvesting machine shown in FIG. 1.

In accordance with certain examples, a crop harvesting machine including a crop-catching apparatus with fluid-carrying conduits is disclosed. Before proceeding with a detailed discussion of the invention, the principal elements and their operation will be described first. Referring to FIGS. 1 and 2A, a crop harvesting machine 10 includes a mobile frame 12 supported for movement over the ground by wheels 14 for movement in a forward direction indicated by an arrow 20. Crop harvesting machine 10 has a front end 64 and a back end 66, and a length defined by the distance between front end 64 and back end 66. As shown in FIG. 2A, mobile frame 12 includes within a crop harvesting tunnel 22, which may take on any shape so long as crop plants can be straddled therein. In the exemplary embodiment as shown in FIG. 2A, crop harvesting tunnel 22 has an inverted U-shaped configuration formed by a top side 26 joined at its two ends by two opposing vertical sides 24.

Crop harvesting machine 10 further includes means for severing crops, for imparting vibrational, oscillatory, or other motions to sever crops grown on a crop plant and to cause them to fall, as known in the art. In the exemplary embodiment shown in FIG. 2A, means for severing crops comprise crop shakers 16 which include elongate flexible members disposed on opposing vertical sides 24 of crop harvesting tunnel 22.

Figure 2B:
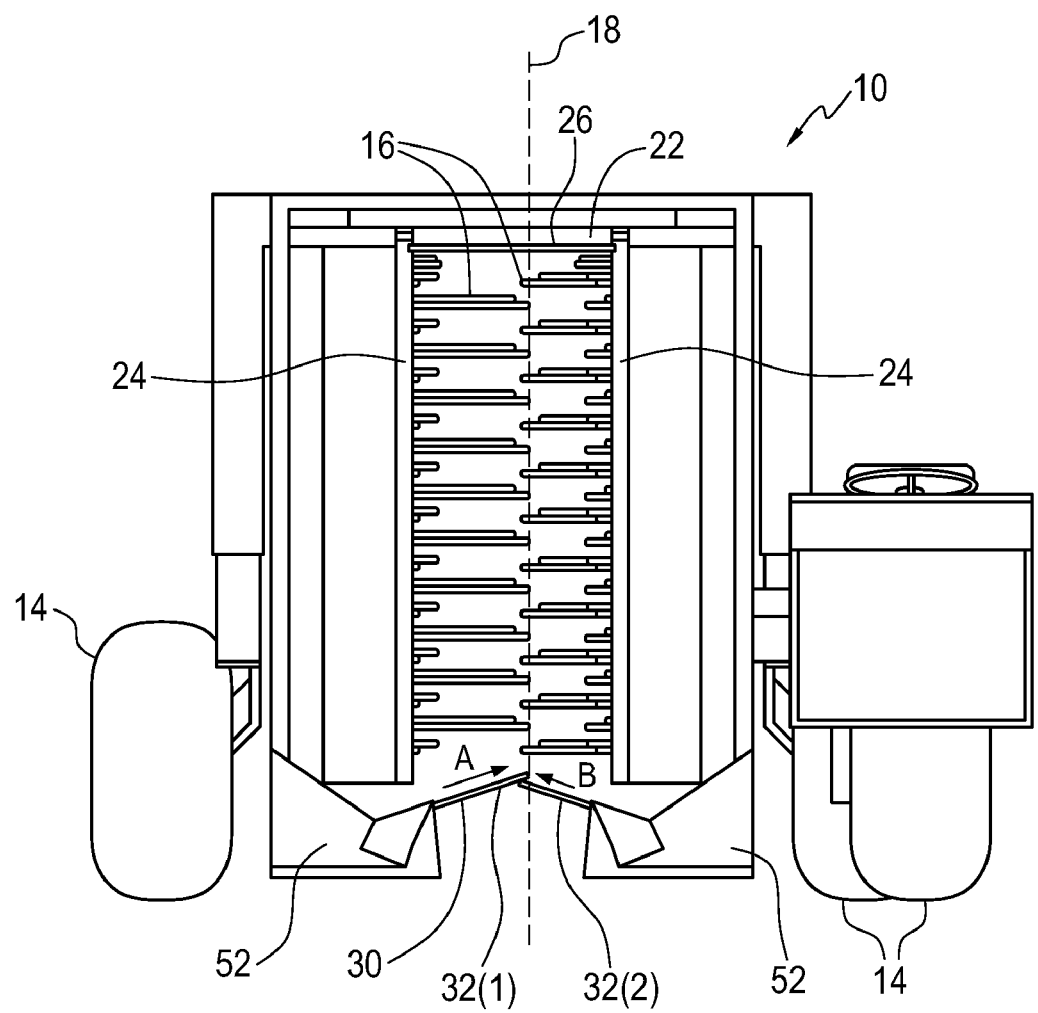
FIG. 2B illustrates a front end view of an exemplary crop harvesting machine according to another embodiment of the present invention.
Figure 5:
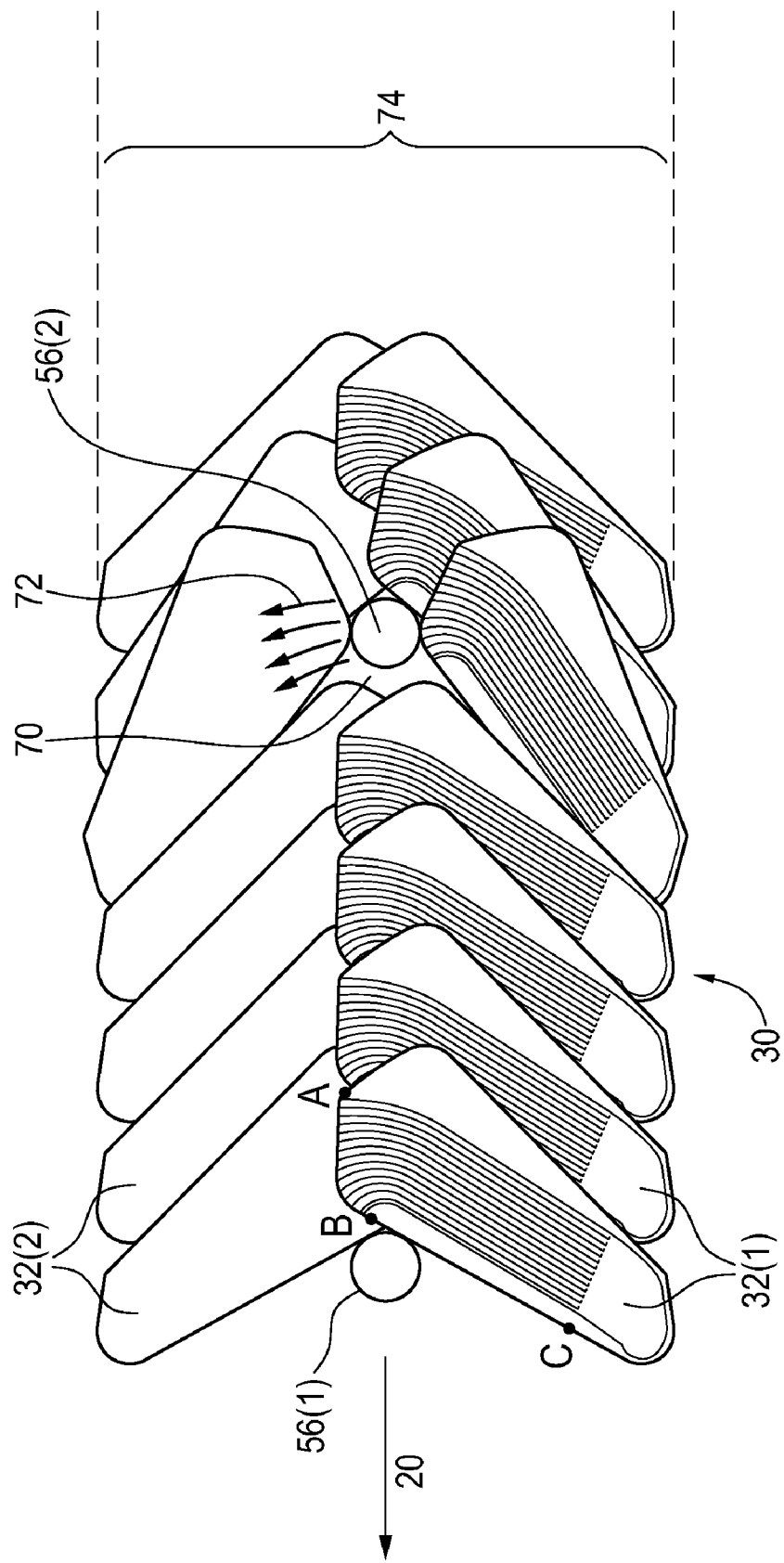
FIG. 5 illustrates a perspective view of an exemplary crop-catching apparatus according to an embodiment of the invention with a plurality of top plate members and bottom plate members disposed in respective rows.

Crop harvesting machine 10 also includes a crop-catching apparatus 30, which includes top plate members 32(1) and bottom plate members 32(2), as best shown in FIG. 5 with reference to FIG. 2A. In one embodiment, crop-catching apparatus 30 may be pivotally connected to mobile frame 12 of crop harvesting machine 10. The precise connection of top plate members 32(1) and bottom plate members 32(2) to crop harvesting machine 10 may be best understood by the function of crop-catching apparatus 30, which is adapted for 1) contacting stems of crop plants and hinging away therefrom to allow the crop plant s to pass between a pair of crop-catching plates; 2) catching falling crops on a top surface of the crop-catching apparatus; and 3) carrying one or more fluids input from a fluid source and conducted through one or more fluid conduits in the crop-catching apparatus, to be output from one or more fluid outputs, such as to divert a direction of fall of the crops. As such, in one embodiment, top plate members 32(1) and bottom plate members 32(2) of crop-catching apparatus 30 may be pivotally connected to any part of harvesting machine 10 and using any suitable method or arrangement of pivotal connection such that top plate members 32(1) and bottom plate members 32(2) form respective rows of corresponding plate members along the length of crop harvesting machine 10 and oppose each other, as best shown in FIG. 5. For example, in the embodiment as shown in FIG. 2A, top plate members 32(1) and bottom plate members 32(2) may be fitted onto crop harvesting machine 10 via a pivotal connection to opposing vertical sides 24 of crop harvesting tunnel 22. In another embodiment as shown in FIG. 2B, top plate members 32(1) and bottom plate members 32(2) are alternatively pivotally connected to the inner surface of mounts 52, which may be disposed below crop-harvesting tunnel 22. Accordingly, as is clear from FIGS. 2A and 2B, the respective pivotal connections of crop-catching apparatus 30 to crop harvesting machine 10 shown therein both result in an ordered array of top plate members 32(1) and bottom plate members 32(2) in the manner as described above and as shown in FIG. 5.

Figure 3:
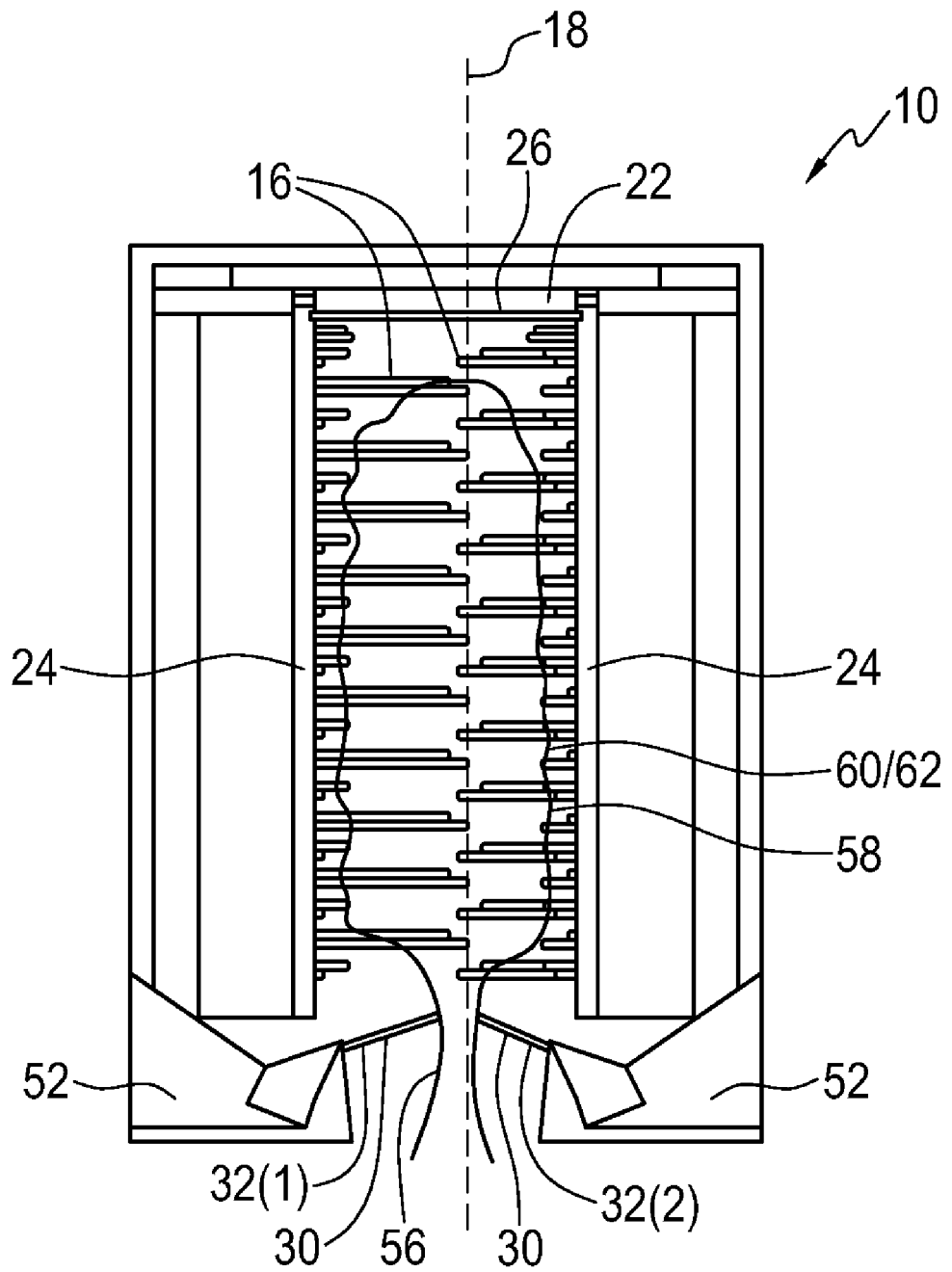
FIG. 3 illustrates a front end view of the exemplary crop harvesting machine shown in FIG. 2B with a crop plant straddled therein.

FIG. 3 illustrates a front end view of the exemplary crop harvesting machine shown in FIG. 2B with a crop plant straddled therein. As shown in FIG. 3, in relation to a crop plant 60 straddled in crop harvesting tunnel 22, crop-catching apparatus 30 may be advantageously pivotally connected to crop harvesting machine 10 at a height that contacts crop plant 60 at its stem portion 56 to maximize the collection of crops falling from a bush portion 58 of crop plant 60.

As shown in FIGS. 2A, 2B and 3, in one embodiment, to further improve the collection of crops falling from crop plants, plate members 32(1) and 32(2) may be adapted to incline upwardly towards the center of crop harvesting tunnel 22 indicated by dotted center line 18 such that falling crops dropped anywhere thereon may desirably roll downwards away from dotted center line 18 towards vertical opposing sides 24 of crop harvesting tunnel 22, such as may be suited for collection in a crop conveyor or the like, for example.

As discussed above in reference to FIG. 5 and now further described, in one embodiment, crop-catching apparatus 30 may be pivotally connected to crop harvesting machine 10 in a manner such that plate members 32(1) and bottom plate members 32(2) form respective rows of corresponding plate members along the length of crop harvesting machine 10 and oppose each other. In the particular embodiment as shown in FIG. 5, crop-catching apparatus 30 may be further arranged such that the opposing rows of top plate members 32(1) and bottom plate members 32(2) partially overlap each other with top plate members 32(1) disposed on top of bottom plate members 32(2), and such that the plate members on each row also partially overlap neighboring plate members in the same row. However, in other embodiments, top plate members 32(1) and bottom plate members 32(2) may oppose but may not overlap each other.

Figure 4:
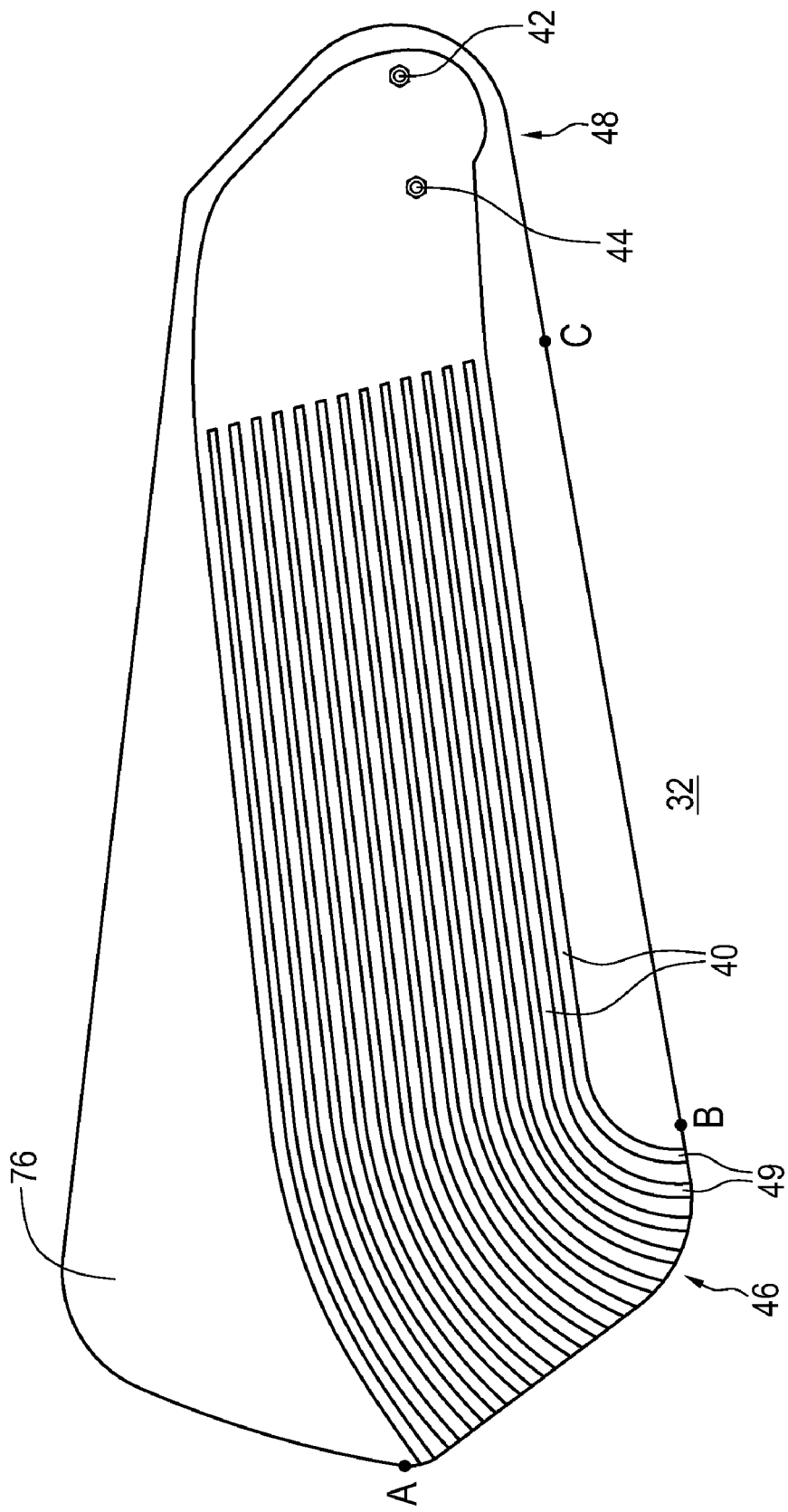
FIG. 4 illustrates a perspective view of an exemplary plate member of a crop-catching apparatus according to an embodiment of the invention.

Still referring to FIG. 5, in another embodiment, plate members 32(1) and 32(2) disposed in respective rows may not only collectively form a surface 74 advantageous for catching falling crops, but may also individually pivot and hinge away from a stem portion 56(2) of a crop plant to open up a path for the crop plant to pass between opposing plate members 32(1) and 32(2) as crop harvesting machine 10 is moved along in the direction of arrow 20. As crop-catching apparatus 30 hinges away to accommodate stem portion 56(2) of a crop plant however, an opening 70 is formed on surface 74 defined by the space between stem portion 56(2) of the crop plant and plate members 32(1) and 32(2). To prevent crops from falling directly through opening 70 to the ground, one or more fluid conduits may be defined in at least one of plates members 32(1) and 32(2), as exemplified in FIG. 4, showing a plate member 32 having fluid conduits 40 defined therein for outputting the one or more fluids from fluid outlets 49 such as to divert the direction of crop fall and to prevent crops from falling through opening 70 between plate members. The construction and operation of plate members 32(1) and 32(2) will be discussed later in greater detail.

To facilitate crop collection, crop harvesting machine 10 as shown in FIG. 1 may further include a conveyer belt (not shown) to transfer the fallen crops from crop catching apparatus 30 to the back end 66 of crop harvesting machine 10 such as to be placed into collecting containers (not shown), as are known in the art.

Referring again to FIG. 1, in operation according to one embodiment, crop harvesting machine 10 may be driven in a forward direction indicated by arrow 20 along and over a row of crop plants 62 bearing crops such as blueberries, raspberries, and coffee beans, for example. However, in other embodiments, the crop-catching apparatus and crop harvesting machine employing same may be used with any suitable type of crop, such as any crop which may grow on bush or small tree crop plants which may fit within a crop harvesting tunnel of machine 10, for example. The row of crop plants 62 enters crop harvesting machine 10 from front end 64 and exits out of back end 66 of crop harvesting machine 10. The row of crop plants 62 enters front end 64 of crop harvesting machine 10 into crop harvesting tunnel 22 in the manner as shown in FIG. 3 (for simplicity only first plant 60 in row 62 is shown), with row 62 being substantially midway between opposing vertical sides 24 of crop harvesting tunnel 22 and substantially coinciding with the center of crop harvesting tunnel 22 as indicated by dotted center line 18. As crop harvesting machine 10 enters further into crop harvesting tunnel 22, the stems of crop plants in row 62 come into contact with crop-catching apparatus 30 in the manner as shown in FIG. 3, illustrating a stem portion 56 of a first plant 60 in row 62 coming into contact with crop-catching apparatus 30. As crop harvesting machine 10 is further moved along, top plate members 32(1) and bottom plate members 32(2) may desirably hinge away from the stems of the crop plant s in row 62 and away from the center of crop harvesting tunnel 30 as indicated by center dotted line 18 in FIG. 3, and open a path for the stems to pass between top plate members 32(1) and bottom plate members 32(2) so crop harvesting machine 20 can continue to travel in the direction of arrow 20 as shown in FIGS. 1 and 5.

As crop harvesting machine 10 is further moved along the direction of arrow 20, the bush portions of crop plants in row 60 come into contact with the means for severing crops, as exemplified in FIG. 3 with a bush portion 58 of first plant 62 in row 60 coming into contact with crop shakers 16. Crop shakers 16 penetrate bush portions of crop plant s in row 60 with harvesting vehicle 10 moving along, and impart motions to cause crops grown on the crop plant s in row 60 to sever from their growth and fall. As shown in FIG. 5 and discussed above, as crop plant 60 is moved along crop-catching apparatus 30, the space between stem portion 56(2) of crop plant 60 and plate members 32(1) and 32(2) forms an opening 70 which creates problems in conventional crop harvesting machines as crops may directly fall through opening 70 to the ground resulting in undesirably crop loss. Referring to FIGS. 4 and 5, according to an embodiment of the present invention, crop loss may be desirably reduced by directing one or more fluids such as air, which may be output (such as under pressure) from fluid outlets 49 of fluid conduits 40 in crop-catching apparatus 30 towards the falling crops, and in the directions as indicated by arrows 72 shown in FIG. 5 away from opening 70. As such, instead of falling through opening 70, crops may desirably be diverted to fall on plate members 32(1) and 32(2), roll downwards towards vertical opposing sides 24 of crop harvesting tunnel 22, and be transferred to collecting containers (not shown) located on crop harvesting machine 10 for collection.

Figure 7:
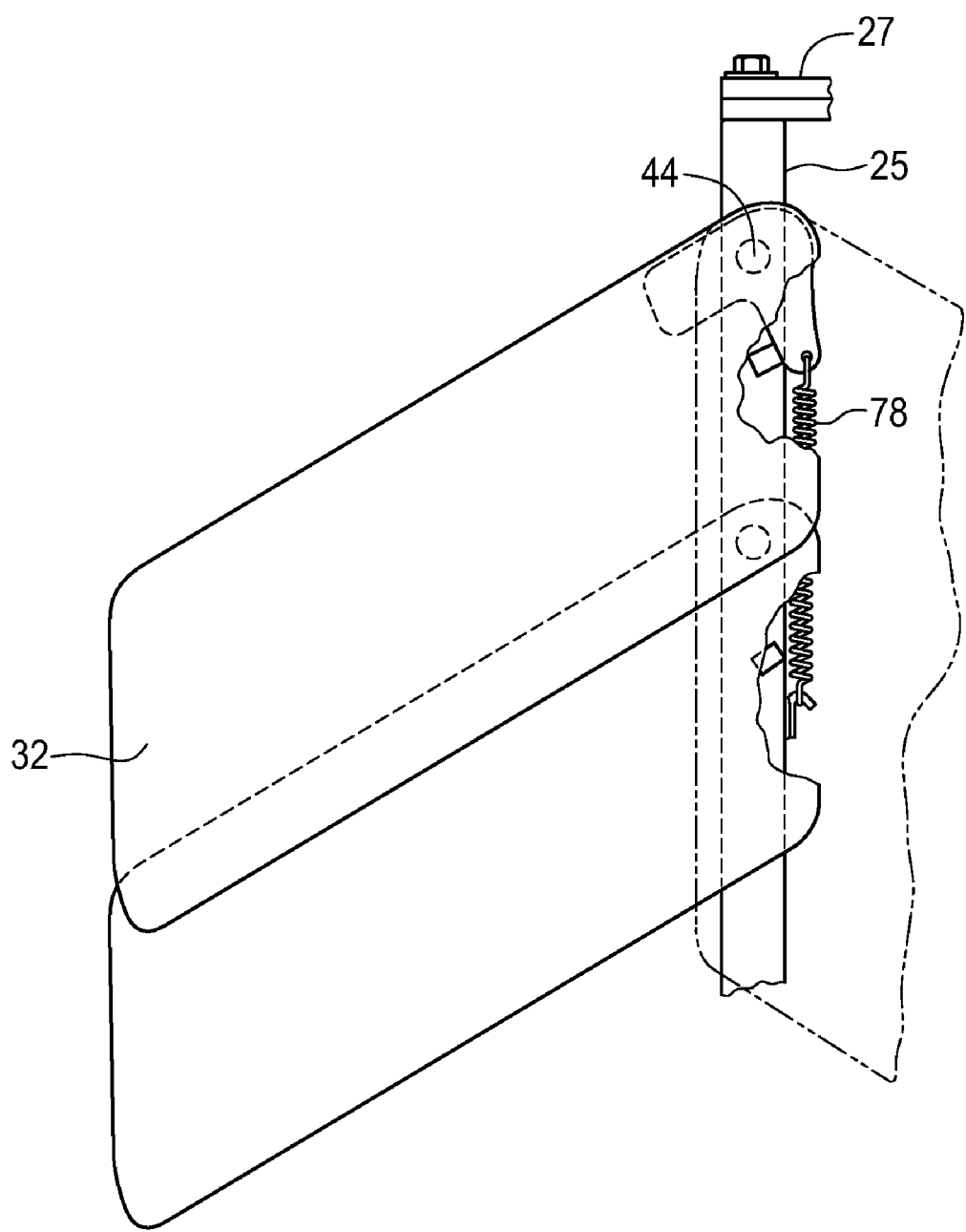
FIG. 7 is a perspective view of plate members 32 of FIG. 4 pivotally connected to crop harvesting machine 10 of FIG. 1.

Having described the principal elements of the present invention and their operation, these elements and the remaining elements of the invention will be described in greater detail. In accordance with certain examples, a crop-catching apparatus having one or more plate members is disclosed. Referring to FIG. 4, an exemplary plate member 32 of a crop-catching apparatus is shown. Plate member 32 may be constructed from any suitable durable and flexible material, such as Plexiglas™ or similar plastic, acrylic, polymer, or flexible metal type materials which may be used in conventional catcher plate designs. In one embodiment, plate member 32 has a leading edge, as shown in FIG. 4, which comprises a portion of plate member 32 defined by a line drawn from points A to B to C. At least a portion of the leading edge may be configured to contact the stems of crop plants. Plate member 32 further has a surface 76 adapted for catching falling crops, and a front end 46 and a back end 48. Back end 48 of plate member 32 may be desirably configured to pivotally mount on crop harvesting machine 10 with any suitable pivotal mounting device or configuration as known in the art. In the exemplary embodiments as shown in FIG. 7, plate member 32 may further include an aperture 42, which may provide entry for a fastening means, such as a threaded bolt, that connects plate member 32 to an exemplary pivoting mounting device such as a loaded spring 78 which may be pivotally connected to beams as shown at 25, which may be carried by brackets 26 that are a part of crop harvesting machine 10. As already discussed and further shown in the embodiments of FIG. 2A in conjunction with FIG. 4, front end 46 of plate member 36 may be configured to rest at a higher elevation with respect to pivotally mounted back end 36 such that falling crops dropped on surface 76 of plate member 32 roll downwards away from dotted center line 18 towards vertical opposing sides 24 of crop harvesting tunnel 22.

In a preferred embodiment of the present invention, one or more fluid conduits are defined on at least one of the plate members of crop-catching apparatus 32. In the exemplary plate member 32 as shown in FIG. 4, a plurality of fluid conduits 40 are defined on plate member 32 for carrying one or more fluids. Fluid conduits 40 may be formed internally in plate member 32 by any suitable means, such as by directional drilling, routing of fluid conduits in a first member portion with a second member portion attached to enclose the conduits therein; molding of fluid conduits in plate members, or other methods as are known in the art. In one embodiment of the present invention, at least about 10-15, and more particularly 14 fluid conduits may be defined on a plate member of crop-catching apparatus 32.

Still referring to FIG. 4, fluid conduits 40 desirably include one or more fluid inlets and outlets. Referring to FIG. 4, plate member 32 has one or more fluid inlets 44 defined thereon for receiving one or more fluids input (such as under pressure) from a fluid source, and one or more fluid outlets 49 defined thereon at the end of each fluid conduit 40. In a particular embodiment, fluid outlets 49 of fluid conduits 40 may be spaced running at least partially along the leading edge of plate member 32, such as between points A and B for example. Fluid outlets 49 may be desirably configured such that the fluids exit therefrom to divert a direction of fall of crops which are falling on or adjacent to the fluid outlets of plate member 32. In one embodiment, compressed air may be input into fluid conduits 40 through fluid inlet 44 in plate member 32, such that compressed air is output from fluid outlets 49 such as to enable the diversion of direction of fall of crops, which may be diverted by the force of the compressed air acting on the falling crops. In such an embodiment, the compressed air fluid may be provided from any suitable source of compressed air, such as an air compressor associated with machine 10, and such compressed air may be input into fluid inlet 44 by any suitable means, such as a compressed air hose connected to a standard fitting on fluid inlet 44, for example.

In a further embodiment, plate member 32 as shown in FIG. 4 may be adapted for use in a crop-catching apparatus 30 of a crop harvesting machine 10 as shown in FIGS. 1, 2A, 2B and 5. As shown in FIG. 5, as crop harvesting machine 10 moves along the direction indicated by arrow 20, the portion of the leading edge of plate members 32(1) and 32(2) between points B and C may be configured to first come into contact with stem portion 56(1) of a crop plant, and hinge away from stem 56(1) to enable the crop plant to move past plate member 32. As crop harvesting machine 10 moves further along, the stem portion of the crop plant is moved further into crop-catching apparatus 30, as illustrated in FIG. 5 showing the stem portion of the crop plant moving from a location indicated by numeral 56(1) to 56(2). As shown at stem portion 56(2), the fluid outlets defined on top plate members 32(1) are oriented such that the one or more fluids exiting therefrom move forward and outward beyond the leading edge as indicated by arrows 72, and such that the one or more fluids divert the fall of the crops to the oppositely disposed row of bottom plate members 32(2). In the crop-catching apparatus 30 as shown in FIG. 5, only top plate members 32(1) have fluid conduits defined therein. However, in other embodiments, both top plate members 32(1) and bottom plate members 32(2) may have fluid conduits defined therein between at least one fluid inlet 44 and at least one fluid outlet 46.

Figure 6A:
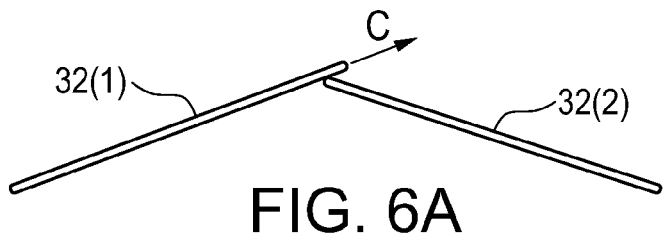
FIGS. 6A-6E illustrates side view of the manner top plate members and bottom plate members are disposed relative to each other, and the direction of the fluids outputting from the plate members according to different embodiments of the invention.
Figure 6B:
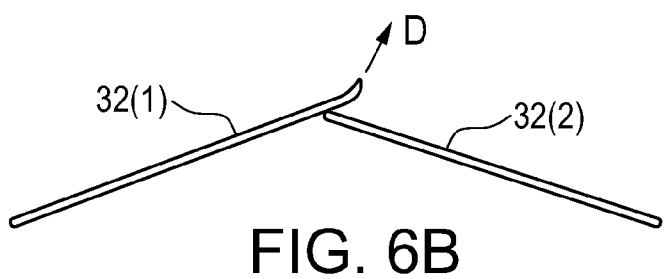
Figure 6C:
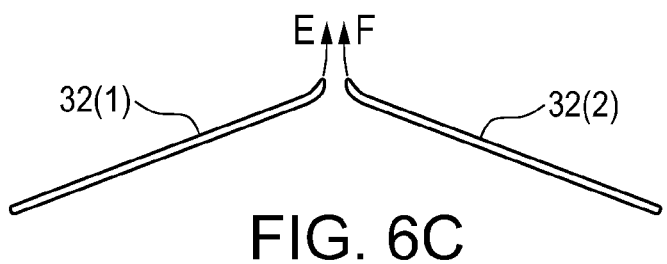
Figure 6D:
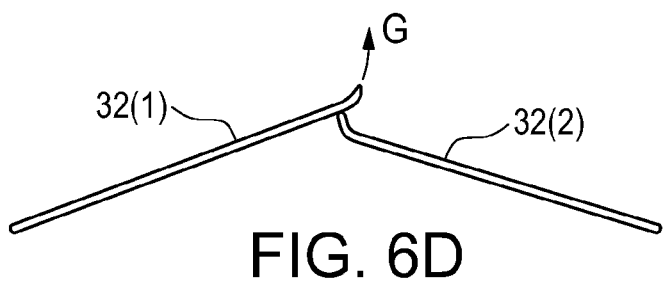
Figure 6E:
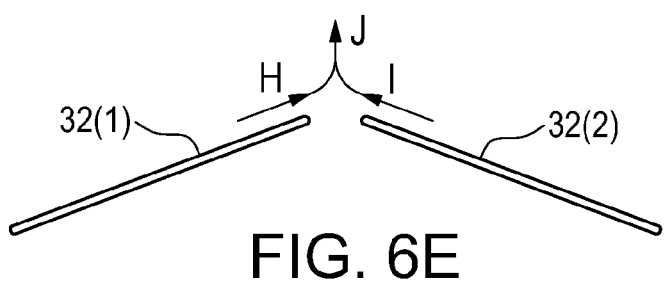

It is to be understood that in some embodiments, top and bottom plate members 32(1) and 32(2) of crop-catching apparatus (30) may not necessarily overlap. It is further to be understood that in yet other embodiments, fluid conduits 40 may be defined on both top plate members 32(1) and bottom plate members 32(2). For example, in the embodiments as shown in FIGS. 2A, 2B and 5, and further shown in FIG. 6A, top plate members 32(1) overlap and are disposed on top of bottom plate members 32(2), and fluid conduits 40 are defined on top plate members 32(1). The direction of the one or more fluids output from fluid outlets 49 of fluid conduits 40 on plate members 32(1) may be in the general direction as indicated by arrow C. The crops diverted by the flow of the one or more fluids exiting the fluid conduits 40 defined in top plate members 32(1) may therefore desirably fall on the bottom plate members 32(2). In another embodiment as shown in FIG. 6D, fluid conduits 40 may be defined on non-overlapping top plate members 32(1) and bottom plate members 32(2). The directions of the one or more fluids output from fluid outlets 49 of fluid conduits 40 on plate members 32(1) and 32(2) may be in the directions as generally indicated by arrows H and I, respectively, and may optionally join such as generally indicated at arrow J. The crops diverted by the flow of the one or more fluids exiting fluid outlets 49 of fluid conduits 40 on plate members 32(1) and 32(2) may therefore fall on both top and bottom plate members 32(1) and 32(2), for example.

In other embodiments, crop-catching plate members may further include an angled front end with respect to a substantially planar plate member surface. In an embodiment as shown in FIG. 6B, top plate members 32(1) may comprise an up-turned lip on their front ends such that the direction of the one or more fluids output from fluid outlets 49 of fluid conduits 40 on top plate members 32(1) may be in the direction as generally indicated by arrow D. In another embodiment as shown in FIG. 6C, top and bottom plate members 32(1) and 32(2) may be non-overlapping. Both top and bottom plate members 32(1) and 32(2) may have an up-turned lip on their front ends such that the directions of the one or more fluids output from outlets 49 of fluid conduits 40 on plate members 32(1) and 32(2) may be in the direction as generally indicated by arrows E and F, respectively. In another embodiment as shown in FIG. 6D, top and bottom plate members 32(1) and 32(2) may be overlapping. Top plate members 32(1) may have an up-turned lip on their front ends such that the direction of the one or more fluids output from outlets 49 of fluid conduits 40 on plate members 32(1) may be in the direction as generally indicated by arrow G.

Referring to FIGS. 1 and 4, in one embodiment of the invention fluid inlet 44 of plate member 32 may be connected with a variety of compressed air inlet fittings suitable to provide a suitable fluid supply, such as compressed air supply, under pressure through fluid conduits 40 to fluid outlets 46 on plate member 32, and may use a conventional compressed air line fitting to supply air from a fluid source, such as an air compressor 54 located onboard crop harvesting machine 10 as shown in FIG. 1, or from an auxiliary air compressor associated with crop harvesting machine 10, for example.

In embodiments where the one or more fluids include compressed air, the compressed air supply rate may preferably be adjusted such as to provide suitable diversion of the fall of a desired type of crop. In one embodiment adapted for use in harvesting blueberries, a compressed air supply rate in the range of about 185 cfm per plate member 32 may be used, although in other embodiments, a variety of air supply rates may be applied as desired by the operator of crop harvesting machine 10.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof. Accordingly, the scope of the invention is to be construed in accordance with the substance defined by the following claims.

What is claimed is:

1. A crop-catching apparatus for use in a crop harvesting machine, the crop-catching apparatus comprising:
   at least one plate member having a surface adapted for catching falling crops, the at least one plate member having a front end and a back end, the at least one back end configured to pivotally mount on the crop harvesting machine, the at least one front end configured to rest at a higher elevation with respect to the pivotally mounted at least one back end, the at least one plate member having a leading edge;
   at least one fluid conduit defined within at least one of the at least one plate member for carrying at least one fluid, the at least one fluid conduit comprising:
   at least one fluid inlet defined on the at least one plate member for receiving the at least one fluid; and
   at least one fluid outlet defined on the plate member running at least partially along the leading edge of the at least one plate member, the at least one fluid outlet configured such that the at least one fluid exits therefrom to divert a direction of fall of the crops.

2. The crop-catching apparatus for use in a crop harvesting machine according to claim 1, wherein the at least one plate member includes at least one top plate member and at least one bottom plate member.

3. The crop-catching apparatus for use in a crop harvesting machine according to claim 2, the at least one top plate member and the at least one bottom plate member having their respective back end pivotally mounted on the crop harvesting machine in a manner such that the at least one top plate member and the at least one bottom plate member form respective rows along the length of the crop harvesting machine and oppose each other.

4. The crop-catching apparatus for use in a crop harvesting machine according to claim 3, wherein the opposing at least one top plate member and the at least one bottom plate member partially overlap each other with the at least one top plate member disposed on top of the at least one bottom plate member.

5. The crop-catching apparatus for use in a crop harvesting machine according to claim 3, wherein the plate members on each row partially overlap neighboring plate members in the same row.

6. The crop-catching apparatus for use in a crop harvesting machine according to claim 2, wherein the at least one conduit is defined within the at least one top plate member.

7. The crop-catching apparatus for use in a crop harvesting machine according to claim 2, wherein the at least one conduit is defined within the at least one top plate member and the at least one bottom plate member.

8. The crop-catching apparatus for use in a crop harvesting machine according to claim 2, wherein the crop harvesting machine includes a crop harvesting tunnel for straddling crop plants therein, the crop harvesting tunnel having opposing vertical sides, the at least one top plate member and the at least one bottom plate member having their respective back end pivotally mounted on the opposing vertical sides of the crop harvesting tunnel of the crop harvesting machine.

9. The crop-catching apparatus for use in a crop harvesting machine according to claim 8, wherein at least a portion of the leading edge of the at least one plate member is configured to contact stems of the crop plants and hinge away from the center of the crop harvesting tunnel to allow the stems of the crop plants to pass between the opposing at least one top plate member and the at least one bottom plate member.

10. The crop-catching apparatus for use in a crop harvesting machine according to claim 1, wherein the at least one fluid outlet is oriented such that the at least one fluid exiting therefrom moves forward and outward beyond the leading edge of the at least one plate member.

11. The crop-catching apparatus for use in a crop harvesting machine according to claim 1, wherein the surface of the at least one plate member is substantially planar, the front end of the at least one plate member being angled with respect to the substantially planar surface.

12. A crop-catching apparatus comprising:
   at least one plate member for catching falling crops and adapted to be fitted to a crop harvesting machine; and
   at least one fluid conduit defined within the at least one plate member and comprising at least one fluid inlet and at least one fluid outlet, for carrying at least one fluid input from a fluid source and outputting the at least one fluid to divert a direction of fall of the crops.

13. A crop harvesting machine comprising:
   a mobile frame;
   means for severing crops grown on a plant; and
   a crop-catching apparatus pivotally connected to the mobile frame, the crop-catching apparatus comprising:
   at least one plate member adapted for catching falling crops; and
   at least one fluid conduit defined within the plate member for carrying at least one fluid input from a fluid source and outputting the at least one fluid to divert a direction of fall of the crops.

14. The crop harvesting machine according to claim 13, wherein the at least one plate member includes a leading edge, the at least one conduit comprising:
   at least one fluid inlet defined on the at least one plate member for receiving the at least one fluid; and at least one fluid outlet defined on the at least one plate member running at least partially along the leading edge of the at least one plate member, the at least one fluid outlet configured such that the at least one fluid exits therefrom to divert a direction of fall of the crops.

15. The crop harvesting machine according to claim 13, wherein the at least one plate member includes at least one top plate member and at least one bottom plate member.

16. The crop harvesting machine according to claim 15, wherein the at least one top plate member and the at least one bottom plate member have their respective back end pivotally mounted on the crop harvesting machine in a manner such that the at least one top plate member and the at least one bottom plate member form respective rows along the length of the crop harvesting machine and oppose each other.

17. The crop harvesting machine according to claim 16, wherein the opposing at least one top plate member and the at least one bottom plate member partially overlap each other with the at least one top plate member disposed on top of the at least one bottom plate member.

18. The crop harvesting machine to claim 15, wherein the at least one conduit is defined within the at least one top plate member.

19. The crop harvesting machine according to claim 15, wherein the at least one conduit is defined within the at least one top plate member and the at least one bottom plate member.

20. The crop harvesting machine according to claim 15, wherein the crop harvesting machine includes a crop harvesting tunnel for straddling crop plants therein, the crop harvesting tunnel having opposing vertical sides, the at least one top plate member and the at least one bottom plate member having their respective back end pivotally mounted on the opposing vertical sides of the crop harvesting tunnel of the crop harvesting machine.

* * * * *